UNITED STATES PATENT OFFICE

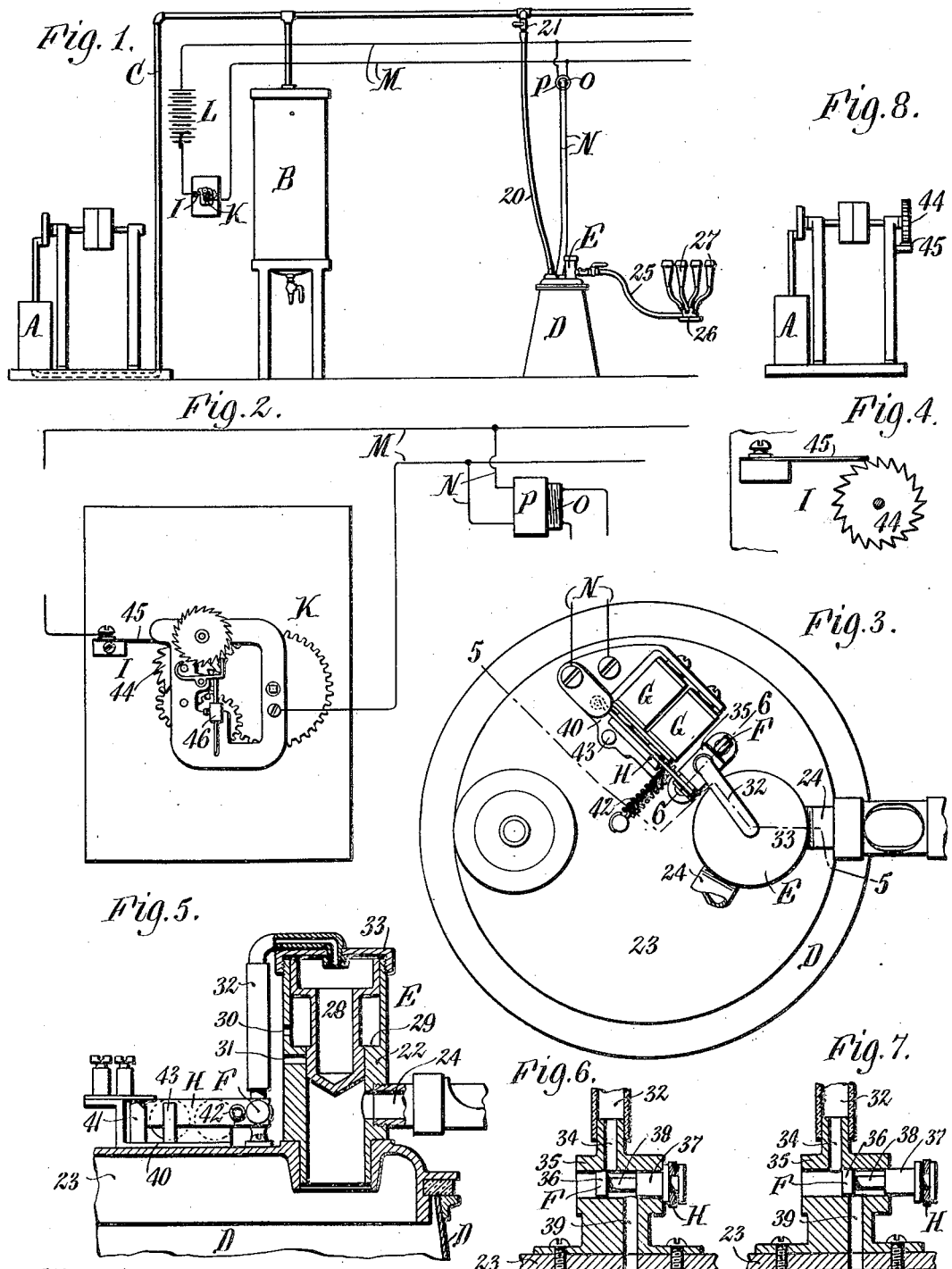

LOOMIS BURRELL, OF LITTLE FALLS, NEW YORK, ASSIGNOR TO D. H. BURRELL & COMPANY, OF LITTLE FALLS, NEW YORK.

MILKING-MACHINE.

942,482.　　　　Specification of Letters Patent.　　Patented Dec. 7, 1909.

Application filed February 7, 1907. Serial No. 356,137.

*To all whom it may concern:*

Be it known that I, LOOMIS BURRELL, a citizen of the United States, residing at Little Falls, in the county of Herkimer and State of New York, have invented a new and useful Improvement in Milking-Machines, of which the following is a specification.

This invention relates to that class of milking machines in which an intermittent or pulsating suction is applied to the teat cups. In milking machines of this character the pulsator is usually portable and comprises a pulsator valve or piston which alternately applies the suction to the teat cups and disconnects the suction therefrom and a small valve for automatically reversing the movement of the pulsator valve or piston. This reversing valve is usually actuated automatically from the pulsator valve or piston by means of intervening mechanism.

The object of this invention is to actuate the reversing valve and through it the pulsator by electric means, so that the movement of the reversing valve is effected by means independent of the pulsator valve or piston, thereby avoiding intervening mechanism for connecting the pulsator valve or piston with the reversing valve.

In the accompanying drawings: Figure 1 is an elevation of a milking machine embodying this invention. Fig. 2 is an elevation of the circuit breaker, on an enlarged scale. Fig. 3 is a top plan, on an enlarged scale, of one of the milk vessels and the pulsator and electric actuating mechanism mounted thereon. Fig. 4 is an elevation of the circuit-breaker wheel and spring. Fig. 5 is a sectional elevation of the pulsator and connecting parts, in line 5—5, Fig. 3. Figs. 6 and 7 are vertical sections of the reversing valve in line 6—6, Fig. 3, on an enlarged scale, showing the valve in different positions. Fig. 8 is an elevation of the suction pump provided with a circuit breaking wheel.

Like letters and numerals of reference refer to like parts in the several figures.

A represents the suction pump, B the equalizing tank, C the main suction pipe extending from the pump through the stable, and D one of the portable milk vessels of which any suitable number can be used and which are connected with the suction pipe by branch pipes 20 applied to nipples 21 on the main suction pipe. All of these parts may be of any suitable or well known construction.

E represents the pulsator which is mounted on the milk vessel D and constructed to be operated by pneumatic means, preferably by the suction applied to the vessel. This pulsator may be constructed and arranged in any suitable manner, the particular construction and arrangement shown serving only to illustrate a desirable type of pulsator and a convenient way of mounting the same.

F represents the reversing valve which is connected with the pulsator for reversing the movement of the piston or valve thereof. In the type of pulsator shown in the drawings the small end of the pulsator valve or piston is always exposed to the suction in the exhausted milk vessel and the reversing valve alternately admits the suction to the large end of the pulsator piston, or cuts off the suction therefrom and admits the outer air to the same, whereby the pulsator piston is caused to move back and forth.

The construction of the pulsator and reversing valve shown in the drawings is as follows: 22 represents the upright pulsator casing secured upon the cover 23 of the milk vessel and having its open lower end opening into the milk vessel. 24 are the nipples in the side of the casing. 25 one of the milk pipes connecting therewith, 26 one of the couplings, and 27 a set of teat cups. 28 represents the pulsator piston or valve arranged with its small lower portion in the lower portion of the casing and with its large upper portion in the upper portion of the casing. 29 represents the shoulder at the junction of the two portions of the casing which limits the movement of the pulsator valve or piston toward the open end of the pulsator casing. 30 and 31 are the air inlets in the casing, one above and the other below this shoulder to admit air to the teat cups for relieving the vacuum when the suction is cut off therefrom and to insure the admission of the external air to the under side of the large upper portion of the piston in all positions of the latter. 32 represents the pipe which connects the upper head 33 of the pulsator casing with the port 34 of the casing 35 of the reversing valve F. The latter is a reciprocating piston valve which is arranged horizontally in the bore of the casing and comprises two pistons 36, 37, and an intermediate reduced connection piece 38. In one position, shown in Fig. 6, the valve places the pipe 32 in communication with the suction passage or port 39 of the valve casing, which port opens through the cover 23 of the milk vessel into the exhausted interior thereof. In the other position, shown in Fig. 7, the valve disconnects the suction port 39 from the pipe 32 and places the latter in communication with the external air through the bore of the valve casing and admits the external air to the pipe and above the piston of the pulsator. When the large end of the pulsator piston 28 is exposed to the suction the piston moves upwardly and when the suction is disconnected from the large end of the piston and the large end is exposed to the atmosphere the piston moves downwardly.

The reversing valve F is actuated by an electro-magnetic mechanism which is intermittently energized and which may be of any suitable construction. That shown in the drawings comprises two electro-magnets G which are mounted side by side upon a bed plate 40 which is secured to the cover 23 of the milk vessel, and an armature H which is attached at one end to the reversing valve and pivoted at the opposite end 41 to the bed plate 40.

42 represents a retracting spring which draws the armature away from the magnets, the return movement of the armature being limited by any suitable means, for instance, by a stop 43. When the magnets are energized the tension of the spring is overcome and the armature is attracted, thereby moving the reversing valve in one direction, and when the magnets are deënergized the spring moves the armature away from the magnets, thereby moving the valve in the opposite direction. The current for energizing the electro-magnets intermittently may be produced in any suitable manner, for instance, by a circuit breaker I of well known construction comprising a toothed wheel 44 and a contact spring 45. This wheel may be actuated by a clock mechanism K, Fig. 2, having a pendulum 46, the weight of which is adjustable to regulate the frequency of the pulsations which range usually from 50 to 60 per minute. If desired, the wheel may be driven from the shaft of the suction pump A, as represented in Fig. 8.

L represents the battery or generator which supplies the current; M represents the main conductors connected therewith, and N represents the branch conductors which are detachably connected with the outlets of the main conductors by contact plugs O of any suitable construction; the main conductors, which extend through the stable, being provided with outlets or sockets P at suitable points.

The reversing valve F is comparatively small and the power which is required for moving the same is correspondingly small and can be readily supplied by a small electro-magnet. The electro-magnetic mechanism for actuating the reversing valve is therefore comparatively light and can be easily carried about, together with the pulsator, whether mounted upon the milk vessel, as shown, or otherwise supported. The pulsator valve or piston is much larger than the reversing valve and requires greater power for moving the same, which power is supplied by pneumatic means.

I claim as my invention:

1. In a milking machine, the combination of teat cups, a suction apparatus, a pulsator which applies the suction intermittently to the teat cups and which is moved by pneumatic means, and an electric mechanism which operates the pulsator, substantially as set forth.

2. In a milking machine, the combination of teat cups, a suction apparatus, a pulsator which applies the suction intermittently to the teat cups, a reversing valve for the pulsator, and an electric mechanism which actuates the reversing valve, substantially as set forth.

3. In a milking machine, the combination of teat cups, a suction apparatus, a pulsator having a reciprocating valve which applies the suction intermittently to the teat cups and which is acted upon by the suction, a reversing valve which alternately applies the suction to the pulsator valve and disconnects the suction therefrom, and an electric mechanism which actuates the reversing valve, substantially as set forth.

4. In a milking machine, the combination of teat cups, a suction apparatus, a pulsator which applies the suction intermittently to the teat cups, an electro-magnetic mechanism for operating the pulsator, a generator, and a circuit-breaker for supplying current intermittently to the electro-magnetic mechanism, substantially as set forth.

5. In a milking machine, the combination of teat cups, a suction apparatus, a pulsator which applies the suction intermittently to the teat cups, a reversing valve for the pulsator, an electro-magnet for actuating the reversing valve, a generator, and a circuit-breaker for supplying current intermittently to the electro-magnet, substantially as set forth.

6. In a milking machine, the combination of teat cups, a suction apparatus, a portable pulsator which applies the suction intermittently to the teat cups, and a portable electric mechanism for operating the pulsator, substantially as set forth.

7. In a milking machine, the combination of teat cups, a suction apparatus, a portable pulsator which applies the suction intermittently to the teat cups, a portable electromagnetic mechanism for operating the pulsator, and a stationary circuit-breaker for supplying current intermittently to said electro-magnetic mechanism, substantially as set forth.

8. The combination of teat cups, a primary pulsator which produces pulsations of a power transmitting medium, a secondary pulsator which produces pulsations in the teat cups and which is movable independently of the primary pulsator, and means for transmitting to the secondary pulsator the pulsations produced by the primary pulsator.

9. The combination of teat cups, a primary pulsator which produces pulsations of a power transmitting medium, a secondary pulsator which responds to said pulsations and produces pulsations in the teat cups, and means for actuating the primary pulsator independently of the secondary pulsator.

10. In a milking machine, a pulsator, an electro-magnet for controlling the same, a source of electrical energy to which the electro-magnet is connected, and means for causing the electro-magnet and pulsator to act intermittently.

11. In a milking apparatus, a pulsator, electro-magnetically operated means controlling the action of the pulsator, an electric circuit including a source of energy, and means for alternately making and breaking the circuit.

12. A milking apparatus including a milk receptacle, a vacuum tank connected to the milk receptacle and adapted to maintain a practically constant degree of vacuum therein, teat cups, milk tubes leading therefrom, and an electro-magnetically operated pulsator controlling communication between the milk tubes and the receptacle.

13. In a milking machine, the combination of a vacuum milk receptacle, an air-tight cover therefor, a pulsator mounted on said cover and having vacuum, milk and air connections, and an electro-magnet mounted on said cover and operatively connected with said pulsator.

14. In a milking apparatus, a vacuum milk receptacle, an air and milk passage for said receptacle, an electro-magnetically operated pulsator for controlling said air and milk passage, an electric generator, electric connections between said electric generator and said pulsator, and a circuit interrupter included in said connections for making and breaking the circuit to said pulsator.

15. In a milking machine, the combination of a portable pulsator adapted to produce suction impulses in the pipe between the milk receptacle and the cow, and a portable electric mechanism for operating the pulsator.

16. In a milking machine provided with teat-cups, and vacuum producing apparatus, a pulsator to control the period of maximum vacuum upon the cups, electrical means to operate the pulsator valve, a circuit changing device in the electric circuit, and a variable speed motor to operate said changing device and regulate the frequency of action of the electrical means upon the pulsator valve.

Witness my hand this 31st day of January, 1907.

LOOMIS BURRELL.

Witnesses:
CHAS. B. DALZELL,
CHAS. STINGER.